United States Patent
Kim et al.

(10) Patent No.: US 10,215,917 B2
(45) Date of Patent: Feb. 26, 2019

(54) DIGITAL BEZEL OF DISPLAY DEVICE

(71) Applicant: TOVIS CO., LTD., Incheon (KR)

(72) Inventors: Yong Beom Kim, Incheon (KR); Kyung Ha Lee, Changwon-si (KR)

(73) Assignee: TOVIS CO., LTD., Incheon (KR)

( * ) Notice: Subject to any disclaimer, the term of this patent is extended or adjusted under 35 U.S.C. 154(b) by 0 days.

(21) Appl. No.: 15/757,372

(22) PCT Filed: Sep. 3, 2015

(86) PCT No.: PCT/KR2015/009278
§ 371 (c)(1),
(2) Date: Mar. 5, 2018

(87) PCT Pub. No.: WO2017/039034
PCT Pub. Date: Mar. 9, 2017

(65) Prior Publication Data
US 2018/0239084 A1    Aug. 23, 2018

(51) Int. Cl.
| | | |
|---|---|---|
| *G02B 6/08* | (2006.01) | |
| *G02F 1/1335* | (2006.01) | |
| *G02F 1/1333* | (2006.01) | |
| *G02B 6/02* | (2006.01) | |
| *A47G 1/06* | (2006.01) | |

(52) U.S. Cl.
CPC ............. *G02B 6/08* (2013.01); *A47G 1/0616* (2013.01); *G02B 6/02052* (2013.01); *G02F 1/1333* (2013.01); *G02F 1/133524* (2013.01); *G02F 2001/133388* (2013.01)

(58) Field of Classification Search
None
See application file for complete search history.

(56) References Cited

U.S. PATENT DOCUMENTS

| 4,693,552 A | * | 9/1987 | Jeskey | G02B 6/06 |
| | | | | 385/116 |
| 5,321,789 A | * | 6/1994 | Kida | G02B 6/06 |
| | | | | 348/E5.141 |
| 9,389,703 B1 | * | 7/2016 | Olsen | G06F 3/0346 |
| 9,997,130 B2 | * | 6/2018 | Lee | G09G 5/003 |

(Continued)

FOREIGN PATENT DOCUMENTS

| CN | 101593473 A | * 12/2009 |
| JP | 2012-150366 A | 8/2012 |

(Continued)

OTHER PUBLICATIONS

International Search Report for PCT/KR2015/009278 dated Jun. 2016 from Korean Intellectual Property Office.

*Primary Examiner* — Michael Stahl
(74) *Attorney, Agent, or Firm* — Revolution IP, PLLC

(57) ABSTRACT

A digital bezel of a display device includes: a display device including a bezel region for displaying an image different from an effective screen by dividing a frame portion of an effective screen of the display device; and an optical pick-up member, mounted in the bezel region, for picking up an image displayed in the bezel region in a straight line by a predetermined thickness to three-dimensionally highlight the image. As such, the three-dimensional effect of the image can be emphasized and manufacturing costs can be reduced.

10 Claims, 10 Drawing Sheets

(56) References Cited

U.S. PATENT DOCUMENTS

| | | | | |
|---|---|---|---|---|
| 2009/0085831 | A1* | 4/2009 | Odoi | G02F 1/133524 345/1.3 |
| 2009/0289874 | A1* | 11/2009 | Ha | H04N 5/64 345/1.3 |
| 2011/0227810 | A1* | 9/2011 | McKinney | G06F 1/1626 345/1.3 |
| 2011/0255301 | A1* | 10/2011 | Watanabe | G02F 1/13336 362/558 |
| 2013/0271447 | A1 | 10/2013 | Setlur et al. | |
| 2014/0145910 | A1* | 5/2014 | Yoo | G06F 1/1641 345/1.3 |
| 2014/0340341 | A1 | 11/2014 | Park et al. | |
| 2015/0362797 | A1* | 12/2015 | Wang | G02F 1/133524 359/599 |
| 2018/0128973 | A1* | 5/2018 | Powell | G02B 6/06 |

FOREIGN PATENT DOCUMENTS

| | | |
|---|---|---|
| KR | 10-2008-0079973 A | 9/2008 |
| KR | 10-2009-0121504 A | 11/2009 |
| KR | 10-2013-0061240 A | 6/2013 |
| KR | 10-2013-0115174 A | 10/2013 |
| KR | 10-2014-0042403 A | 4/2014 |

\* cited by examiner

[FIG.1]
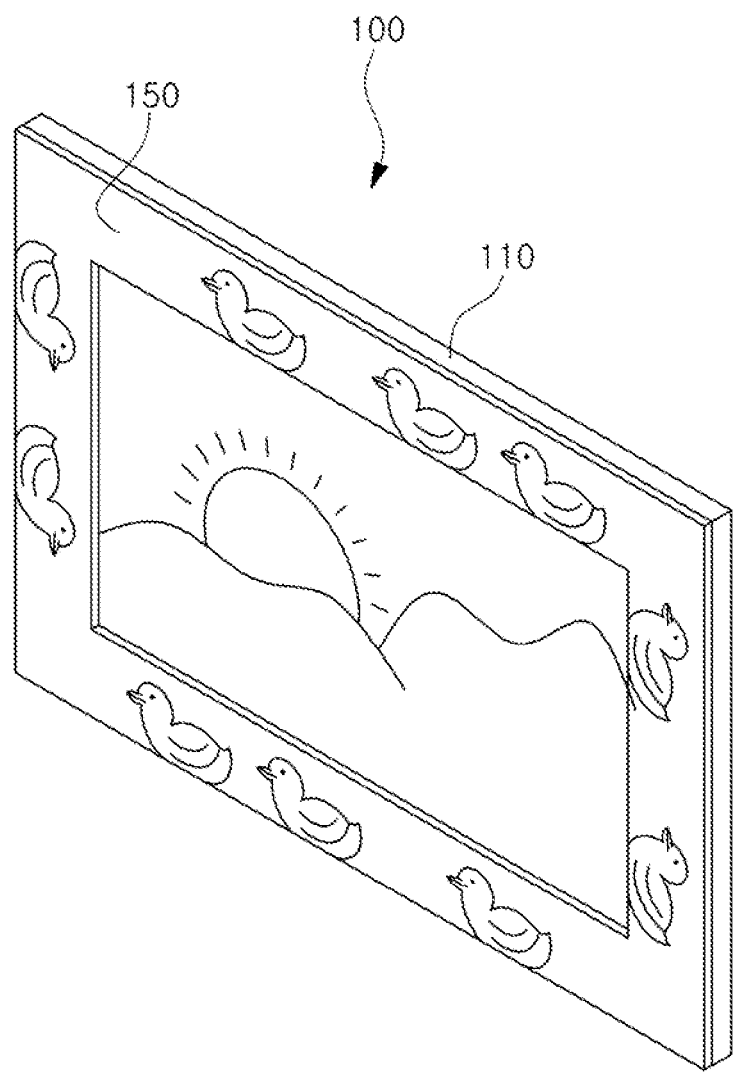

[FIG.2]
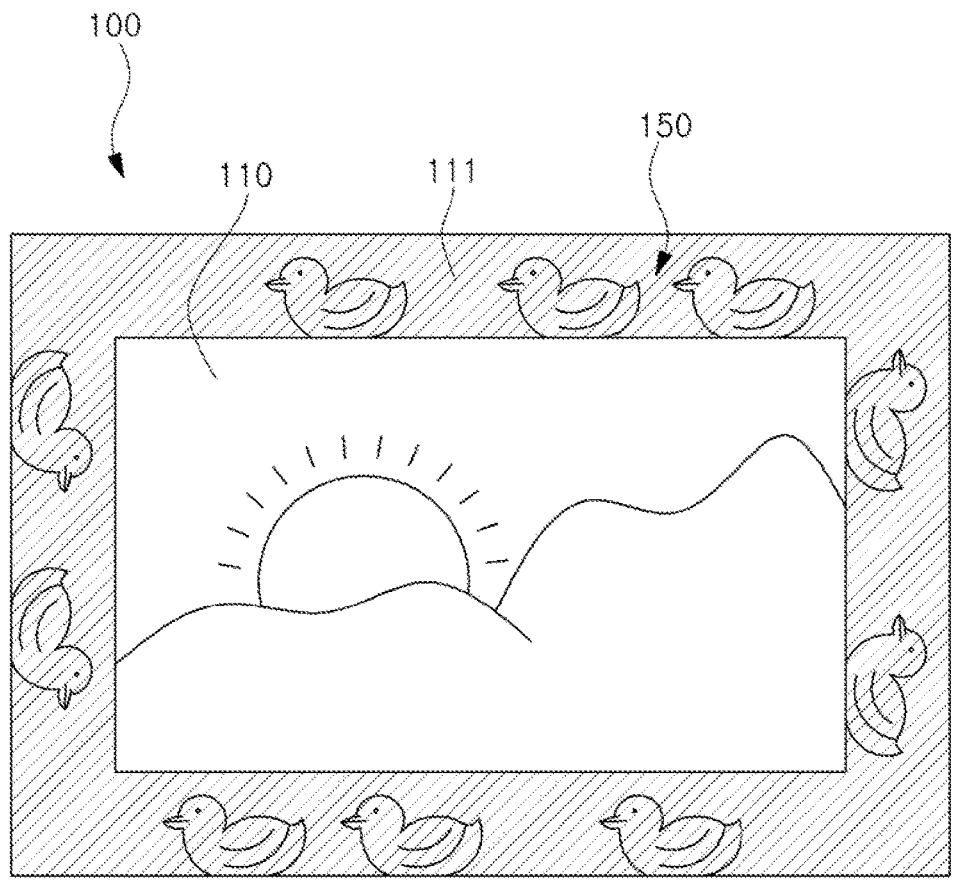

[FIG.3]
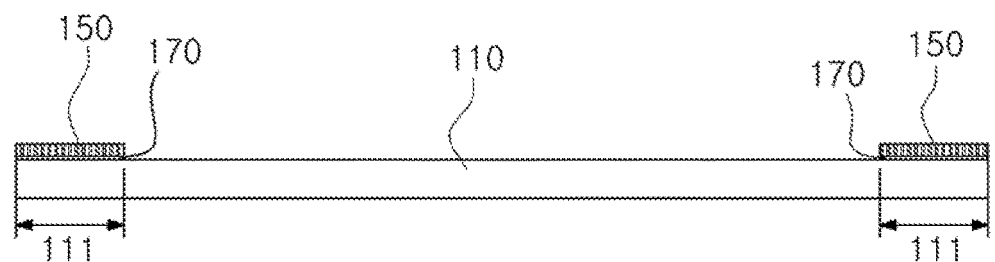

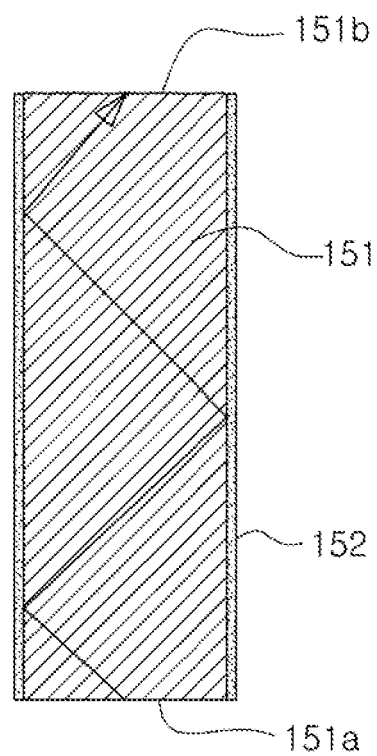
[FIG.4]

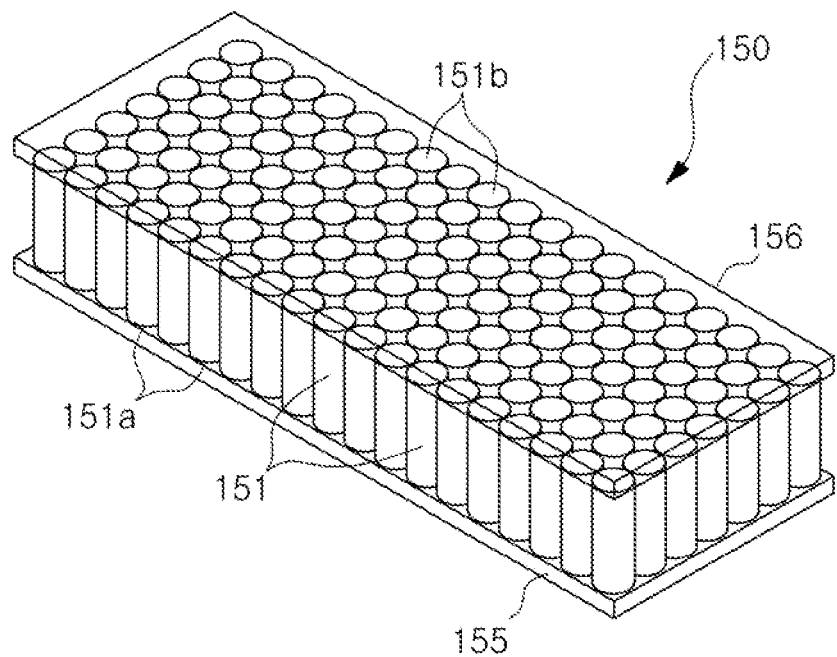

[FIG.6]
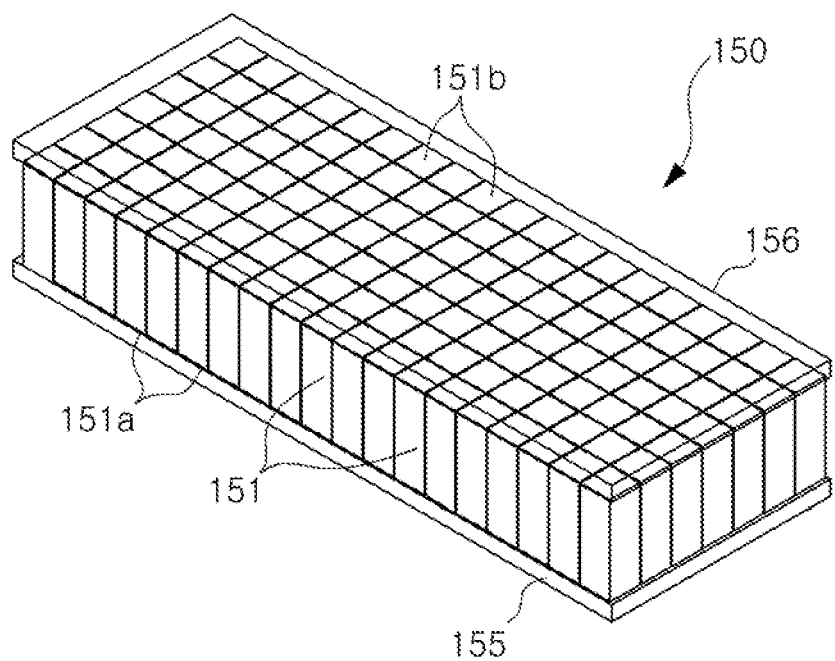

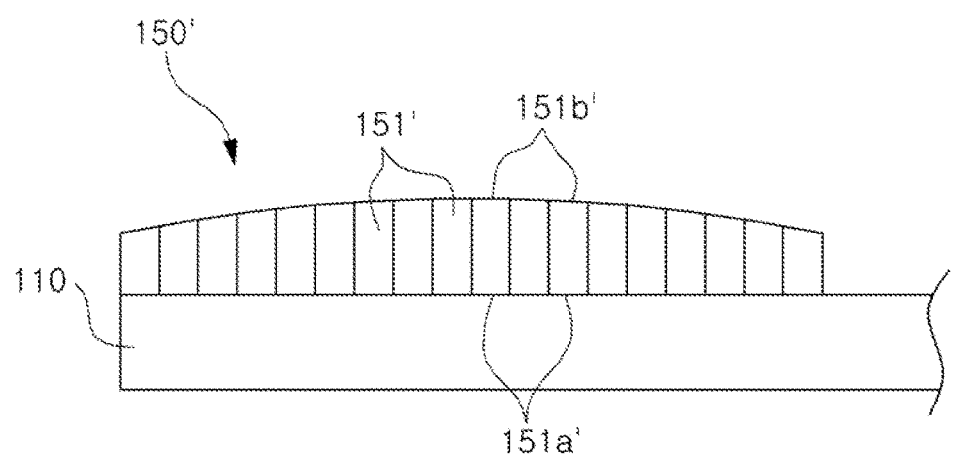
[FIG.7]

[FIG.8]
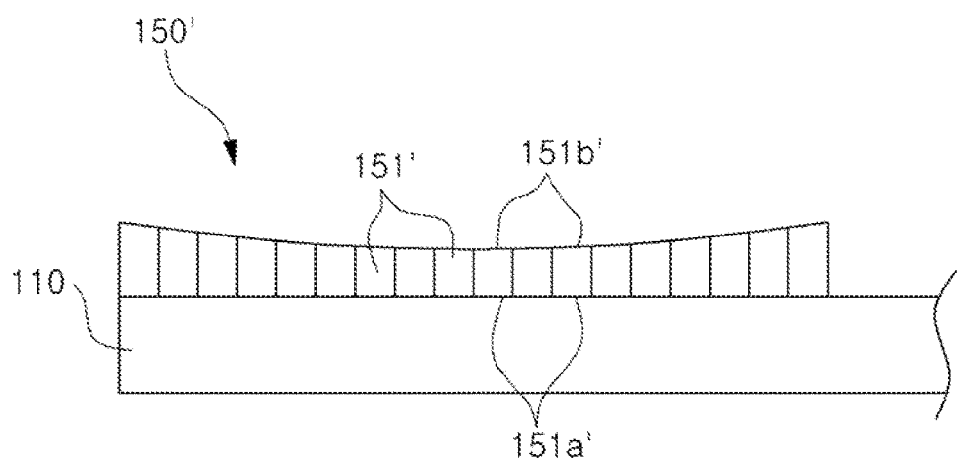

[FIG.9]
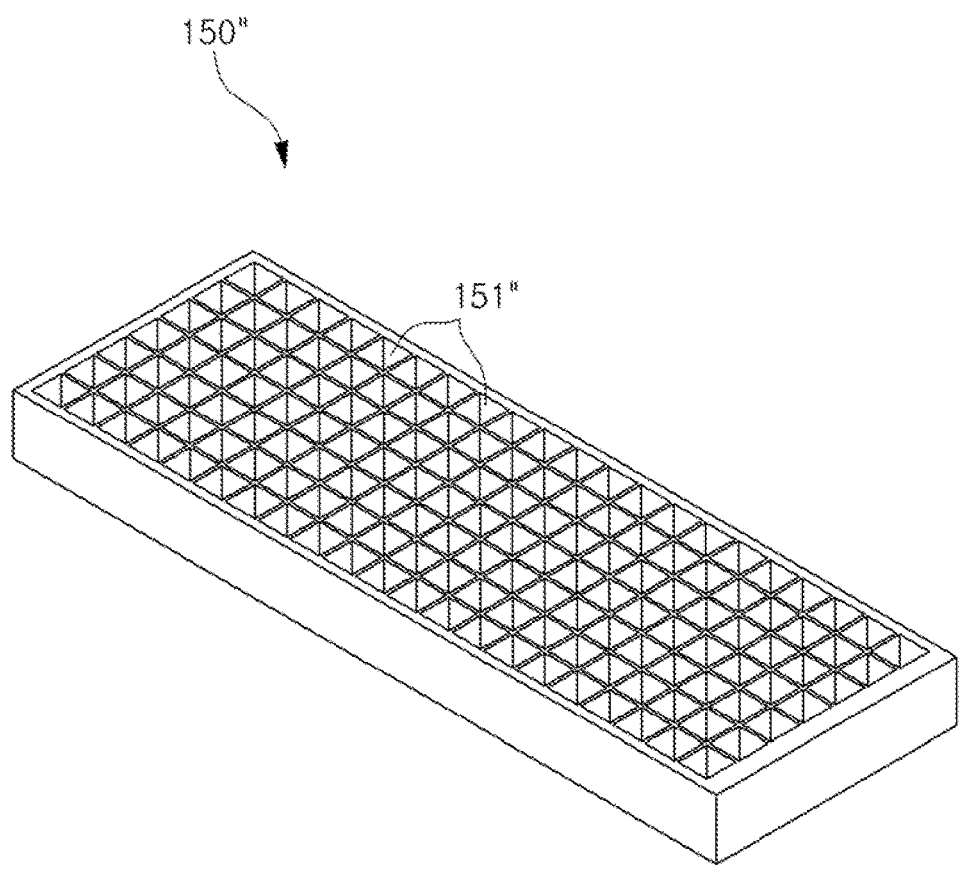

[FIG.10]
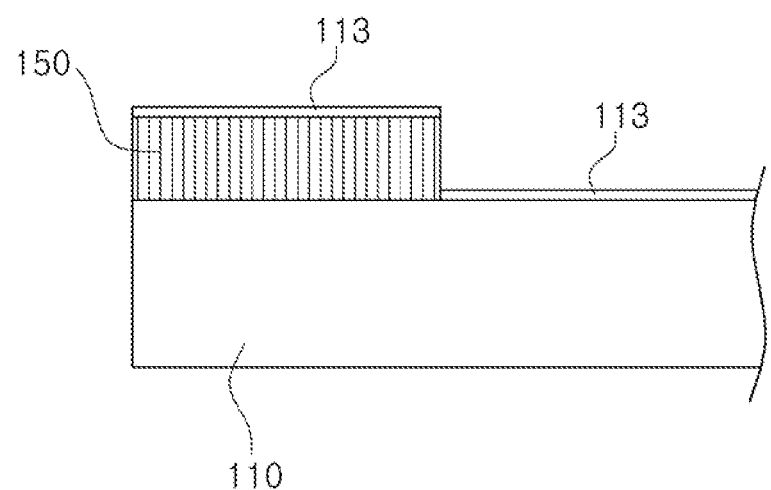

DIGITAL BEZEL OF DISPLAY DEVICE

TECHNICAL FIELD

The present invention relates to a display device digital bezel, which enables the display of an image on a bezel, i.e. on the rim of an image display device.

BACKGROUND ART

In general, a display device is a device that receives an image source and outputs an image. The rim of the display device is provided with a bezel in order to fix or protect a display panel that displays an image.

Meanwhile, because the bezel simply functions to fix or protect the display panel, a solid bezel has been provided in the display device. Conventionally, in order to avoid the monotonousness of the solid bezel, an image display device, in which a display is disposed in a rim area such that an image may be displayed therein, is disclosed in Korean Patent Laid-Open Publication No. 10-2009-0121504 (published on Nov. 26, 2009).

The conventional image display device in which the display is disposed in the rim area has attempted to avoid the monotonous bezel by providing a second display panel, which is different from a first display panel, which is the major display panel, in the rim area and displaying an image, which is different from that on the first display panel, on the second display panel.

However, the conventional image display device in which the display is disposed in the rim area is expensive to manufacture because it is provided with a plurality of display panels, and it is difficult to impart a special effect thereto because it displays only different images in the same plane, thus failing to stimulate the purchasing desire of purchasers.

DISCLOSURE

Technical Problem

The present invention has been made to solve the problems described above, and an object of the present invention is to provide a display device digital bezel in which an image on a bezel portion may be displayed in a prominent three-dimensional fashion and manufacturing costs thereof may be reduced.

Technical Solution

In order to achieve the above-described object, a display device digital bezel in accordance with an aspect of the present invention includes a display device including a bezel area defined in a rim portion of an effective screen therein to display an image different from an image on the effective screen, and an optical pickup member seated on the bezel area to linearly radiate the image displayed on the bezel area upwards by a preset thickness so as to display the image in a prominent three-dimensional fashion.

The optical pickup member may include a plurality of light guides each including a light-incident surface, which faces the bezel area so that the image displayed on the bezel area is incident on the light-incident surface, and a light-emitting surface, which is spaced apart from the light-incident surface by the preset thickness so that the incident image is emitted from the light-emitting surface.

Each light guide may include a cladding layer configured to surround an outer surface of the light guide so that the image incident on the light-incident surface is totally reflected and emitted to the light-emitting surface.

Each light guide may have a circular or rectangular cross-sectional shape.

The light-emitting surface of each light guide may be formed into an uneven scratched surface to expand a viewing angle of the image incident on the light-incident surface.

The scratched surface may be formed by flattening the light-emitting surface using a polishing member and then polishing the light-emitting surface using a rougher polishing member than the polishing member for flattening.

The optical pickup member may further include a first transparent base plate attached to the light-emitting surface and a second transparent base plate attached to the light-incident surface, in order to support the light guides.

The display device digital bezel may further include a polarizer removed from the bezel area of the display device and attached to an outer surface of the optical pickup member after the optical pickup member is attached to the bezel area.

The light-emitting surface of each light guide may be curved so that the optical pickup member includes a curved outer surface.

The light-incident surface may be curved in an opposite direction relative to the light-emitting surface in order to prevent image distortion on the curved light-emitting surface.

The optical pickup member may include a plurality of light guide holes formed therein to have a shape corresponding to the bezel area and configured to cause the image displayed on the bezel area to be incident thereon and emitted therefrom.

The optical pickup member may be formed of a black material in order to prevent leakage of light passing through the light guide holes.

Advantageous Effects

According to the present invention, an image to be displayed in a bezel area is displayed in different planes by an optical pickup member to increase the three-dimensional effect of an image, whereby it is possible to improve design effects as well as other effects such as advertising, promotions, and game events and to stimulate the purchasing desire of purchasers.

In addition, the optical pickup member is configured so as to be attached to the bezel area, whereby it is possible to ensure easy manufacture and to reduce manufacturing costs.

DESCRIPTION OF DRAWINGS

FIG. 1 is a perspective view illustrating a display device digital bezel according to a first embodiment of the present invention.

FIG. 2 is a front view illustrating the display device digital bezel according to the first embodiment of the present invention.

FIG. 3 is a schematic side view illustrating the display device digital bezel according to the first embodiment of the present invention.

FIG. 4 is a side sectional view illustrating a light guide included in the display device digital bezel according to the first embodiment of the present invention.

FIG. 5 is a perspective view illustrating an optical pickup member, in which a light guide has a cylindrical shape, included in the display device digital bezel according to the first embodiment of the present invention.

FIG. 6 is a perspective view illustrating an optical pickup member, in which a light guide has a square columnar shape, included in the display device digital bezel according to the first embodiment of the present invention.

FIG. 7 is a schematic side sectional view illustrating a portion of a display device digital bezel, in which an optical pickup member is formed to have a convexly curved outer surface, according to a second embodiment of the present invention.

FIG. 8 is a schematic side sectional view illustrating a portion of the display device digital bezel, in which an optical pickup member is formed to have a concavely curved outer surface, according to the second embodiment of the present invention.

FIG. 9 is a perspective view illustrating an optical pickup member included in a display device digital bezel according to a third embodiment of the present invention.

FIG. 10 is a schematic side view illustrating a portion of a display device digital bezel according to a fourth embodiment of the present invention.

<Description of Reference Numerals>

100: display device digital bezel
110: display device
111: bezel area
113: polarizer
150, 150', 150": optical pickup member
151, 151': light guide
151": light guide hole
151a: light-incident surface
151b: light-emitting surface
152: cladding layer
155: first plate
156: second plate
170: adhesive member

BEST MODE

Hereinafter, embodiments of the present invention will be described with reference to the accompanying drawings.

In this specification, "optical pickup" refers to convergence of external light from a light source (an image to be displayed on a display) via total reflection.

As illustrated in FIGS. 1 and 2, a display device digital bezel 100 according to a first embodiment of the present invention may include a display device 110.

The display device 110 may receive an image source and display an image.

Meanwhile, the display device 110 may be an LCD, OLED, or PDP. The display device 110 may include a bezel area 111.

The bezel area 111 may be obtained by dividing a portion of an effective screen of the display device 110, on which an image is displayed, and may display an image, which is different from an image displayed on the effective screen. The bezel area 111 may be located in a rim portion of the effective screen of the display device 110.

For example, in the case of the display device 110 having a 27-inch effective screen, which includes a central portion having a size of 23 inches, the bezel area 111 may be set to a remaining peripheral rim portion having a size of about 4 inches, excluding the central portion of the display device 110.

Here, the image displayed on the bezel area 111 may not be different from an image displayed on the effective screen, and may be the image displayed over the entire effective screen including the bezel area 111.

In addition, the rim portion of the display device 110, to which the bezel area 111 is set, may be the entire rim of the display device 110, or may be a part or the entirety of the rim of both of left and right sides, both of upper and lower sides, or any one side.

Meanwhile, the display device 110 may include a controller, which controls different images to be displayed on the effective screen and the bezel area 111. A single controller may be provided to control different images to be displayed respectively on the effective screen and the bezel area, which are divided from each other, or two controllers may be provided to independently control the effective screen and the bezel area so as to display different images thereon. Such a controller may be realized in a hardware or software fashion to control the display device 110.

As illustrated in FIGS. 3, 5 and 6, the display device digital bezel according to the first embodiment of the present invention may include an optical pickup member 150.

The optical pickup member 150 may be attached to the bezel area 111, and may radiate an image upwards to be displayed on the outer surface thereof in order to impart a three-dimensional effect to the image displayed on the bezel area 111 due to a height difference.

Meanwhile, the optical pickup member 150 may be formed to have a shape corresponding to the bezel area 111 and a preset thickness. Here, the preset thickness may be approximately 0.5~10 mm.

In addition, as illustrated in FIG. 4, the optical pickup member 150 may include a light guide 151.

The light guide 151 may include a light-incident surface 151a and a light-emitting surface 151b. The light-incident surface 151a may be located at a position at which it faces the bezel area 111 so as to cause an image displayed on the bezel area 111 to be incident thereon. The light-emitting surface 151b may be spaced apart from the light-incident surface 151a by the preset thickness so that the image incident on the light-incident surface 151a is emitted therefrom.

Meanwhile, the light guide 151 may be configured such that light incident on the light-incident surface 151a is totally reflected therein to thereby be emitted to the light-emitting surface 151b. The light guide 151 may be formed as a medium having an index of refraction equal to or greater than 1. The light guide 151 may be formed of a transparent resin, which is the same material as optical fibers.

In addition, the light guide 151 may have an uneven scratched surface so that the light of the image incident on the light-incident surface 151a is expanded to the entire light-emitting surface 151b.

The scratched surface may be formed by polishing the light-emitting surface of the light guide 151 using a polishing member in order to flatten the light-emitting surface, and then again polishing the same using a polishing member, which has a rougher surface than that of the polishing member used for flattening, in order to form unevenness.

In addition, the light guide 151 may be formed into a column having a circular, rectangular, or polygonal cross-sectional shape, the diameter or side length of which is hundreds of micrometers and the height of which corresponds to the preset thickness. The entire optical pickup member 150 may be shaped by collecting and bonding a plurality of light guides 151.

The light guides 151 may be bonded to each other by a transparent optical adhesive, or may be bonded to each other in a molten state upon pressurization or manufacture and then cured.

Here, the optical pickup member 150 may be formed by setting a 3D printer nozzle to the diameter of the light guides 151 and stacking the light guides 151 in a horizontal state or arranging the light guides 151 in an upright state.

Meanwhile, the light guide 151 may include a cladding layer 152.

The cladding layer 152 may prevent an image passing through the light guide 151 from being discharged outwards.

Meanwhile, the cladding layer 152 may be formed to surround the remaining periphery of the light guide 151 excluding the light-incident surface 151*a* and the light-emitting surface 151*b*. The cladding layer 152 may be formed of a material having high reflectance.

In addition, the cladding layer 152 may be formed in a coated form on the light guide 151.

Although the light guides 151 may configure the optical pickup member 150 in such a manner that they have the size corresponding to pixels of the bezel area 111 and are arranged at positions corresponding to the pixels as needed, it may not be necessary to arrange or form the light guides 151 so as to correspond to the pixels in order to reduce manufacturing costs. Here, the pixels may be respective R, G and B pixels, or may be pixels each of which includes R, G and B pixels.

In addition, the optical pickup member 150 may include a first plate 155 and a second plate 156 for supporting the light guides 151. The first plate 155 may be attached to the light-incident surfaces 151*a* of the arranged light guides 151, and the second plate 156 may be attached to the light-emitting surfaces 151*b* to support the light guides 151 (see FIGS. 5 and 6).

Meanwhile, the first plate 155 and the second plate 156 may be formed of a transparent material having high light transmittance, and may be manufactured to have high flatness in order to minimize distortion of an image upon absorption and emission thereof.

Meanwhile, the first plate 155 and the second plate 156 may be attached to the light guides 151 by an optical adhesive, or may be bonded thereto via pressing. The light guides 151, the first plate 155, and the second plate 156 may be manufactured in an integrated form using a 3D printer.

As illustrated in FIG. 3, the display device digital bezel 100 according to the first embodiment of the present invention may include an adhesive member 170.

The adhesive member 170 may attach the optical pickup member 150 to the bezel area 111.

Meanwhile, the adhesive member 170 may take the form of a piece of adhesive tape in which adhesive layers are provided on transparent opposite surfaces having high light transmittance, or may be a transparent optical adhesive formed of a material having high light transmittance. The adhesive member 170 may be applied to or attached to the overall surface of the optical pickup member 150 at which the light-incident surfaces 151*a* of the light guides 151 are disposed.

The operations and effects of the respective components described above will be described below.

In the display device digital bezel 100 according to the first embodiment of the present invention, the bezel area 111, which is capable of displaying an image different from that on the effective screen, is set on the display device 110, and the optical pickup member 150 is attached to the bezel area 111 using the adhesive member 170 such that the light-incident surfaces 151*a* of the light guides 151 face the bezel area 111.

Meanwhile, the optical pickup member 150 is configured by bonding a bundle of the light guides 151 to have the shape of the bezel area 111. The optical pickup member 150 may include the first plate 155 and the second plate 156, respectively disposed opposite the light-incident surfaces 151*a* and the light-emitting surfaces 151*b* in order to support the light guides 151.

In addition, the light-emitting surface 151*b* of the light guide 151 may be formed as a scratched surface in order to expand the light of an image incident on the light-incident surface 151*a*.

The display device digital bezel 100 configured as described above radiates an image on the bezel area 111 upwards to the outer surface of the optical pickup member 150 such that the image displayed on the bezel area 111 is incident on the light-incident surfaces 151*a* of the light guides 151 through the first plate 155 of the optical pickup member 150 and the incident image is totally reflected from the light guides 151 to thereby be emitted to the outer surface of the second plate 156 through the light-emitting surfaces 151*b*.

Since the optical pickup member 150 has the preset thickness, the resulting emitted image is displayed to protrude by the preset thickness, compared to the effective screen of the display device 110, whereby a three-dimensional effect may be imparted to the image.

At this time, the display device 110 may be controlled by a controller so as to display a different image only on the bezel area 111, or to display an image spanning the bezel area 111 and the effective screen.

Accordingly, the display device digital bezel according to the first embodiment of the present invention may display an image on the bezel area, thereby increasing various design effects of the display device 110 and providing improved advertising, promotions, and game-event effects, and consequently, stimulating the purchasing desire of purchasers.

In addition, the display device digital bezel may be manufactured to have a relatively simplified structure, thus resulting in reduced manufacturing costs.

Hereinafter, a second embodiment of the present invention will be described. The same components as those of the first embodiment will be given the same reference numerals, and a detailed description thereof will be omitted because they have the same operations and effects as those of the first embodiment.

As illustrated in FIGS. 7 and 8, the display device digital bezel 100 according to the second embodiment includes an optical pickup member 150' as a distinguishing component.

The optical pickup member 150' may have a curved outer surface in order to further improve the three-dimensional effect of an image to be displayed.

Meanwhile, the optical pickup member 150' may be formed to have an outwardly convexly curved surface overall, or may be formed to have an inwardly concavely curved surface overall.

Meanwhile, in the optical pickup member 150', a light guide 151' has a curved light-emitting surface 151*b*'. As such, when a plurality of light guides 151 are collected and bonded to each other, the overall curved surface of the optical pickup member 150' to be manufactured may be divided into light-incident surfaces 151*a*' of individual light guides 151'.

In addition, the light-incident surface 151*a*' of the optical pickup member 150' may be curved in the opposite direction compared to the light-emitting surface 151*b*'. For example, when the light-emitting surface 151*b*' of the light guide 151' is an outwardly convexly curved surface, the light-incident surface 151a' may be formed into an inwardly concavely curved surface, the opposite of the light-emitting surface 151b'.

Here, when the light-emitting surface 151b' of the optical pickup member 150' is formed into a curved surface, an image to be emitted from the light-emitting surface 151b' may be distorted due to the curved surface. Therefore, in order to prevent distortion of the image from the light-emitting surface 151b', the light-incident surface 151a' may be formed into a curved surface, which is the opposite of the light-emitting surface 151b'.

That is, the light-incident surface 151a' and the light-emitting surface 151b' may be oppositely curved surfaces so that an image is incident on the light-incident surface 151a' so as to be distorted in a manner that compensates for distortion at the light-emitting surface 151b' so as to be finally emitted as a normal image from the light-emitting surface 151b'.

Meanwhile, the optical pickup member 150' according to the second embodiment may be formed in advance to have a curved surface overall, and may then be divided into the plurality of light guides 151'. In this state, the cladding layer 152 may be formed on the outer surface of each light guide 151', and the light guides 151' may again be collected and attached to each other.

At this time, the divided light guides 151' may be attached to each other using a light-transmitting adhesive or by pressing.

Thus, the display device digital bezel 100 according to the second embodiment may display an image on the curved surface of the optical pickup member 150', thereby further increasing the three-dimensional effect of the image.

Hereinafter, a third embodiment of the present invention will be described. The same components as those of the first embodiment will be given the same reference numerals, and a detailed description thereof will be omitted because they have the same operations and effects as those of the first embodiment.

As illustrated in FIG. 9, the display device digital bezel 100 according to the third embodiment of the present invention includes an optical pickup member 150" as a distinguishing component.

The optical pickup member 150" may be formed to have the shape of the bezel area 111, and may have a light guide hole 151" formed therein to transfer an image on the bezel area 111 to the outer surface.

Meanwhile, a plurality of light guide holes 151" may be spaced apart from each other, and the cladding layer 152 may be formed on the inner surface of each light guide hole 151" so as to totally reflect an image.

In addition, in order to prevent the leakage of the image reflected through the light guide holes 151", the optical pickup member 150" may be formed of a black material. The light guide holes 151" may be formed to have a circular or polygonal columnar shape.

With the optical pickup member 150 of the third embodiment configured as described above, when an image is displayed in the state in which the optical pickup member 150" is attached to the bezel area 111 by the adhesive member 170, the image displayed on the bezel area 111 is totally reflected through the light guide holes 151", thereby appearing to be displayed on the outer surface of the optical pickup member 150".

Accordingly, the display device digital bezel 100 according to the third embodiment of the present invention may impart various design effects to the display device 110, and may provide improved advertising, promotions, and game-event effects, and consequently, stimulate the purchasing desire of purchasers.

In addition, the display device digital bezel may be manufactured to have a relatively simplified structure, thus resulting in reduced manufacturing costs.

Hereinafter, a fourth embodiment of the present invention will be described. The same components as those of the first embodiment will be given the same reference numerals, and a detailed description thereof will be omitted because they have the same operations and effects as those of the first embodiment.

As illustrated in FIG. 10, in the display device digital bezel 100 according to the fourth embodiment of the present invention, a polarizer 113 attached to the display device 110 is first removed only from the bezel area 111.

Then, the optical pickup member 150 is attached to the bezel area 111 by the adhesive member 170. Then, the polarizer 113 removed from the display device 110 may be attached to the upper outer surface of the optical pickup member 150, or a new polarizer 113 may be cut to conform to the optical pickup member 150 and may then be attached thereto.

At this time, the first plate 155 and the second plate 156 included in the optical pickup member 150 may be omitted because the polarizer 113 replaces the function of the plates.

In the display device digital bezel 100 configured as described above, an image is incident from the bezel area 111 to the optical pickup member 150 without passing through the polarizer 113, and the incident image is emitted to the top of the optical pickup member 150. The emitted image is polarized by the polarizer 113 and thus appears as a normal image.

Accordingly, with the display device digital bezel according to the fourth embodiment, because an image is first transferred through the optical pickup member 150 without passing through the polarizer 113 and then passes through the polarizer 113 to appear as a normal image, it is possible to minimize damage to the image caused when the image passes through the optical pickup member 150, which enables the display of a vivid image.

It will be apparent that, although the preferred embodiments have been shown and described above, the disclosure is not limited to the above-described specific embodiments, and various modifications and variations can be made by those skilled in the art without departing from the gist of the appended claims. Thus, it is intended that the modifications and variations should not be understood independently of the technical sprit or prospect of the disclosure.

INDUSTRIAL APPLICABILITY

The present invention may be used in industrial fields using displays such as advertising, games, monitors, and TVs.

The invention claimed is:
1. A display device digital bezel comprising:
a display device comprising a bezel area defined in a rim portion of an effective screen therein to display an image different from an image on the effective screen;
an optical pickup member seated on the bezel area to linearly radiate the image displayed on the bezel area upwards by a preset thickness so as to display the image in a prominent three-dimensional fashion; and a polarizer removed from the bezel area of the display device and attached to an outer surface of the optical pickup member after the optical pickup member is attached to the bezel area.

2. The bezel according to claim 1, wherein the optical pickup member comprises a plurality of light guides each comprising a light-incident surface, which faces the bezel area so that the image displayed on the bezel area is incident on the light-incident surface, and a light-emitting surface, which is spaced apart from the light-incident surface by the preset thickness so that the incident image is emitted from the light-emitting surface.

3. The bezel according to claim 2, wherein each light guide comprises a cladding layer configured to surround an outer surface of the light guide so that the image incident on the light-incident surface is totally reflected and emitted to the light-emitting surface.

4. The bezel according to claim 2, wherein each light guide has a circular or rectangular cross-sectional shape.

5. The bezel according to claim 2, wherein the light-emitting surface of each light guide is formed into an uneven scratched surface to expand a viewing angle of the image incident on the light-incident surface.

6. The bezel according to claim 5, wherein the scratched surface is formed by flattening the light-emitting surface using a polishing member and then polishing the light-emitting surface using a rougher polishing member than the polishing member for flattening.

7. The bezel according to claim 2, wherein the optical pickup member further comprises a first transparent base plate attached to the light-emitting surface and a second transparent base plate attached to the light-incident surface, in order to support the light guides.

8. The bezel according to claim 2, wherein the light-emitting surface of each light guide is curved so that the optical pickup member comprises a curved outer surface.

9. The bezel according to claim 1, wherein the optical pickup member comprises a plurality of light guide holes formed therein to have a shape corresponding to the bezel area and configured to cause the image displayed on the bezel area to be incident thereon and emitted therefrom.

10. The bezel according to claim 9, wherein the optical pickup member is formed of a black material in order to prevent leakage of light passing through the light guide holes.

* * * * *